United States Patent
Jarvis

(10) Patent No.: US 11,400,558 B2
(45) Date of Patent: Aug. 2, 2022

(54) APPARATUS AND METHOD FOR DEBURRING A TUBULAR WORKPIECE

(71) Applicant: Stride Tool, LLC, Glenwillow, OH (US)

(72) Inventor: Ryan Jarvis, Mentor, OH (US)

(73) Assignee: STRIDE TOOL, LLC, Glenwillow, OH (US)

(*) Notice: Subject to any disclaimer, the term of this patent is extended or adjusted under 35 U.S.C. 154(b) by 189 days.

(21) Appl. No.: 16/743,495

(22) Filed: Jan. 15, 2020

(65) Prior Publication Data

US 2021/0213583 A1    Jul. 15, 2021

(51) Int. Cl.
  *B23B 5/16*    (2006.01)
  *B24B 9/00*    (2006.01)
  *B23B 51/10*   (2006.01)

(52) U.S. Cl.
  CPC .............. *B24B 9/007* (2013.01); *B23B 5/167* (2013.01); *B23B 51/103* (2013.01); *B23B 2215/72* (2013.01); *B23B 2220/08* (2013.01); *B23B 2251/14* (2013.01); *B23B 2251/24* (2013.01)

(58) Field of Classification Search
  CPC .......... B23B 5/16; B23B 5/167; B23B 5/168; B23B 51/103; B23B 2215/72; B23B 2220/04; B23B 2220/08; B23B 2240/00; B23B 2240/04; B23C 2240/00; B23C 2240/04
  See application file for complete search history.

(56) References Cited

U.S. PATENT DOCUMENTS

| | | | |
|---|---|---|---|
| 3,232,145 A | | 2/1966 | Wilson |
| 3,870,432 A | | 3/1975 | Strybel |
| 4,678,380 A | * | 7/1987 | Zahuranec ............. B23B 5/167 407/33 |
| 6,709,206 B1 | | 3/2004 | Andes |
| 8,613,642 B2 | | 12/2013 | Bowles |
| 9,498,825 B2 | | 11/2016 | Robeson |
| 10,016,812 B2 | | 7/2018 | Ferguson |
| 2012/0257940 A1 | * | 10/2012 | Gowda ..................... B23C 5/06 29/525.01 |

FOREIGN PATENT DOCUMENTS

| | | | | |
|---|---|---|---|---|
| DE | 29608602 U1 | * | 9/1996 | ............. B23B 5/167 |
| EP | 2532458 A1 | | 12/2012 | |
| EP | 2886230 A1 | * | 6/2015 | ......... B23B 51/0406 |

OTHER PUBLICATIONS

English translation of DE 29608602 U1 (Year: 1996).*

* cited by examiner

*Primary Examiner* — Alan Snyder
(74) *Attorney, Agent, or Firm* — Tarolli, Sundheim, Covell & Tummino LLP

(57) ABSTRACT

An apparatus for selectively removing material from both an inner and outer circumference of an end of a tubular workpiece includes a cylindrical outer frame. A blade holder is affixed to the outer frame. The blade holder has a conical configuration with a base located adjacent a first rim of the outer frame and an apex located adjacent a second rim of the outer frame. At least one ID blade is carried by the blade holder and has an ID cutting edge oriented radially outward. At least one OD blade is carried by the blade holder and has an OD cutting edge oriented radially inward. A motive cap has a rim-coupling feature configured for selective engagement sequentially with the first and second rims of the outer frame, to selectively provide rotational motion to the outer frame and thus indirectly to the blade holder.

18 Claims, 8 Drawing Sheets

APPARATUS AND METHOD FOR DEBURRING A TUBULAR WORKPIECE

TECHNICAL FIELD

This disclosure relates to an apparatus and method for use of selectively removing material from both an inner and outer circumference of an end of a tubular workpiece and, more particularly, to deburring a tube having an inside wall radially separated by a tube wall from an outside wall, the tube having a cut tube end with an inner cut rim located at an intersection of the inside wall and the cut tube end and an outer cut rim located at an intersection of the outside wall and the cut tube end, at least one of the inner and outer cut rim including a burr.

BACKGROUND

When a tubular workpiece is cut transversely, often a burr or roughened edge is left around part of the inner or outer circumference of the cut end. It can be difficult and/or time-consuming to file, sand, or otherwise mechanically removed the roughened material in order to place the cut edge in a smooth or finished condition.

SUMMARY

In an aspect, an apparatus for selectively removing material from both an inner and outer circumference of an end of a tubular workpiece is disclosed. A cylindrical outer frame defines a frame lumen with longitudinally spaced first and second rims. A blade holder is substantially located radially within the frame lumen and affixed to the outer frame. The blade holder has a conical configuration with a base located adjacent the first rim of the outer frame and an apex located adjacent the second rim of the outer frame. At least one ID blade is carried by the blade holder and has an ID cutting edge oriented radially outward toward the outer frame. At least one OD blade is carried by the blade holder and has an OD cutting edge oriented radially inward toward a central axis of the outer frame. A motive cap has a rim-coupling feature configured for selective engagement sequentially with the first and second rims of the outer frame. The motive cap is operative to selectively provide rotational motion to the outer frame and thus indirectly to the blade holder.

In an aspect, an apparatus for deburring a tube having an inside wall radially separated by a tube wall from an outside wall is provided. The tube has a cut tube end with an inner cut rim located at an intersection of the inside wall and the cut tube end, and an outer cut rim located at an intersection of the outside wall and the cut tube end. At least one of the inner and outer cut rims includes a burr. An outer frame has longitudinally spaced first and second frame rims. The outer frame radially encloses a deburring volume. The outer frame defines a longitudinal axis. A first cap-coupling feature is located adjacent the first frame rim. A second cap-coupling feature is located adjacent the second frame rim. A blade holder is affixed substantially within the deburring volume. The blade holder has a concave holder portion opening toward the first frame rim and a convex holder portion narrowing toward the second frame rim. The blade holder defines a longitudinal axis coextending with the longitudinal axis of the outer frame. At least one inner cut rim deburring blade is maintained by the convex holder portion at an angle with the longitudinal axis of the blade holder. At least one outer cut rim deburring blade is maintained by the concave holder portion at an angle with the longitudinal axis of the blade holder. A motive cap includes a rim-coupling feature configured for selective engagement sequentially with the first cap-coupling feature and the second cap-coupling feature. The motive cap is operative to selectively provide rotational motion to the outer frame and thus indirectly to the blade holder.

In an aspect, a method of selectively deburring a tube having an inside wall radially separated by a tube wall from an outside wall is disclosed. The tube has a cut tube end with an inner cut rim located at an intersection of the inside wall and the cut tube end, and an outer cut rim located at an intersection of the outside wall and the cut tube end. At least one of the inner and outer cut rims includes a burr. An apparatus including a cylindrical outer frame defining a frame lumen with longitudinally spaced first and second rims is provided. A blade holder is substantially located radially within the frame lumen and is affixed to the outer frame. The blade holder has a conical configuration with a base located adjacent the first rim of the outer frame and an apex located adjacent the second rim of the outer frame. At least one ID blade is carried by the blade holder and has an ID cutting edge oriented radially outward toward the outer frame. At least one OD blade is carried by the blade holder and has an OD cutting edge oriented radially inward toward a central axis of the outer frame. A motive cap has a rim-coupling feature configured for selective engagement with the outer frame. The rim-coupling feature of the motive cap is selectively engaged to the second rim of the outer frame. The cut tube end is inserted past the first rim and into the blade holder with the OD blade contacting the outer cut rim. Rotational motion is transmitted from the motive cap to the second rim of the outer frame to rotate the blade holder, thus urging the OD blade into deburring contact with the cut tube end. The cut tube end is removed from the blade holder and the motive cap is removed from the second rim of the outer frame. The rim-coupling feature of the motive cap is selectively engaged to the first rim of the outer frame. The cut tube end is inserted past the second rim and into the blade holder with the ID blade contacting the inner cut rim. Rotational motion is transmitted from the motive cap to the second rim of the outer frame to rotate the blade holder, thus urging the ID blade into deburring contact with the cut tube end. The cut tube end is removed from the blade holder and the motive cap is removed from the first rim of the outer frame.

BRIEF DESCRIPTION OF THE DRAWINGS

For a better understanding, reference may be made to the accompanying drawings, in which.

DESCRIPTION OF ASPECTS OF THE DISCLOSURE

Figure 1:
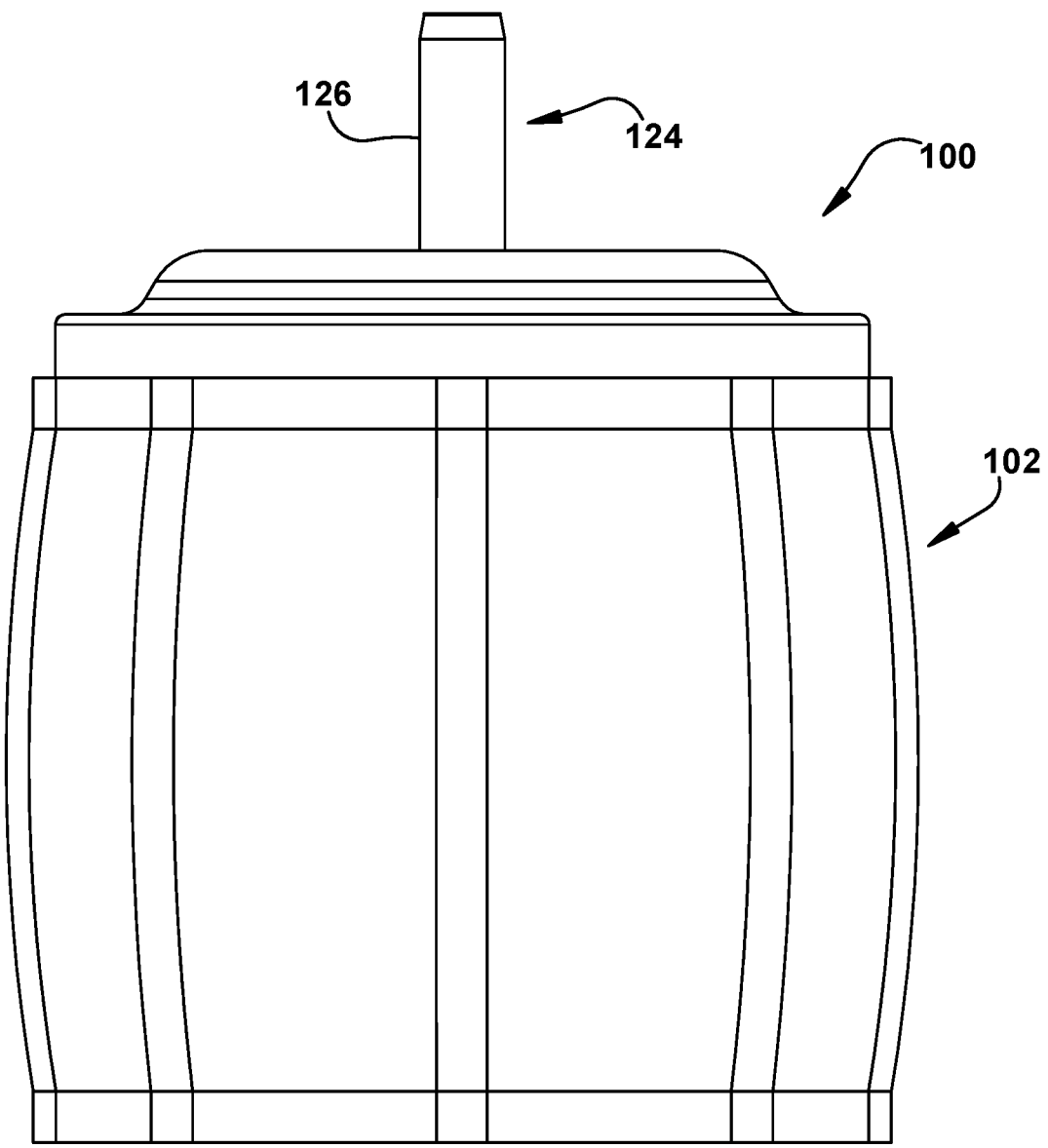
FIG. 1 is a side view of an aspect of the present invention.

Unless defined otherwise, all technical and scientific terms used herein have the same meaning as is commonly understood by one of skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 2:
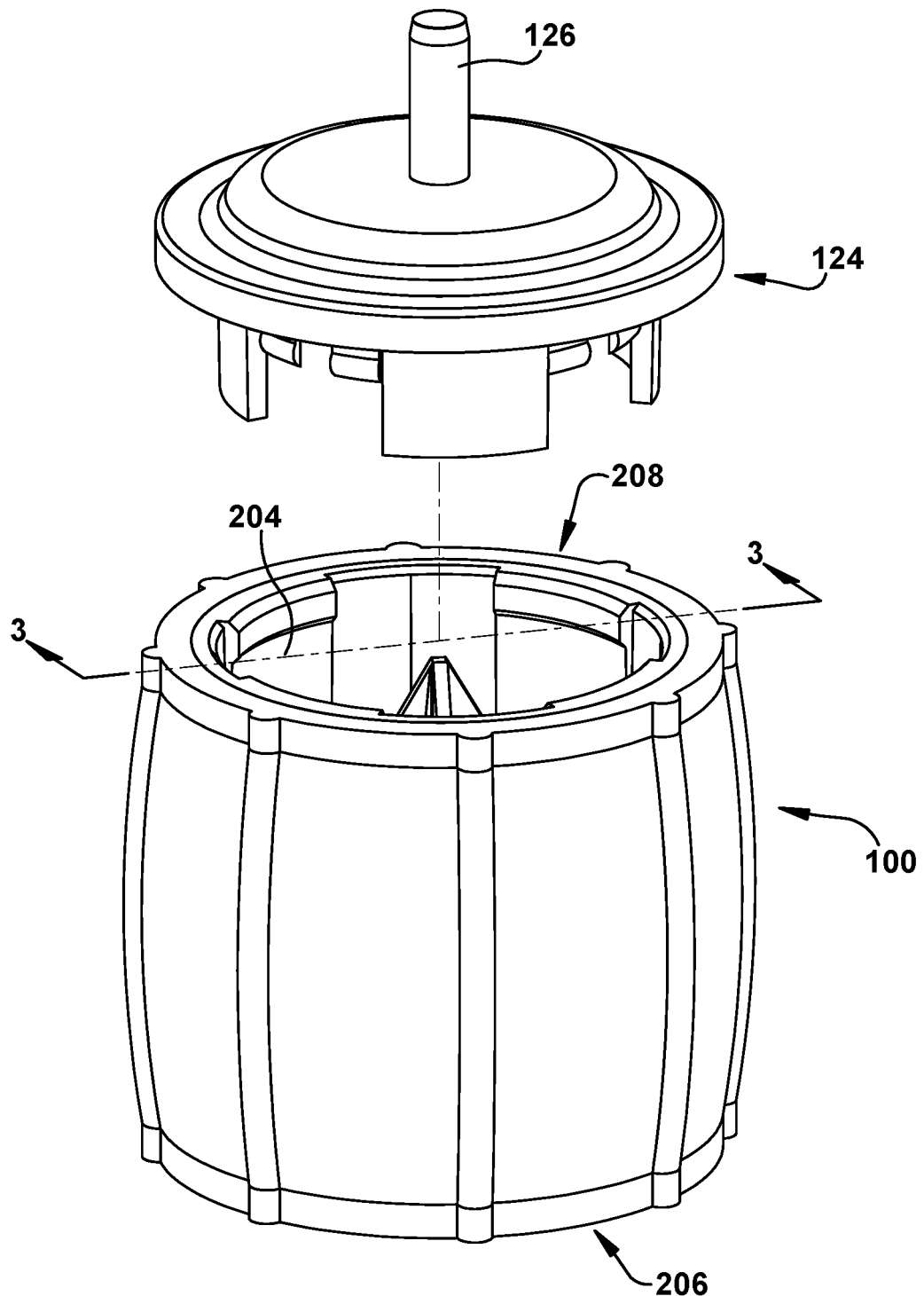
FIG. 2 is an exploded top perspective view of the aspect of FIG. 1.
Figure 3:
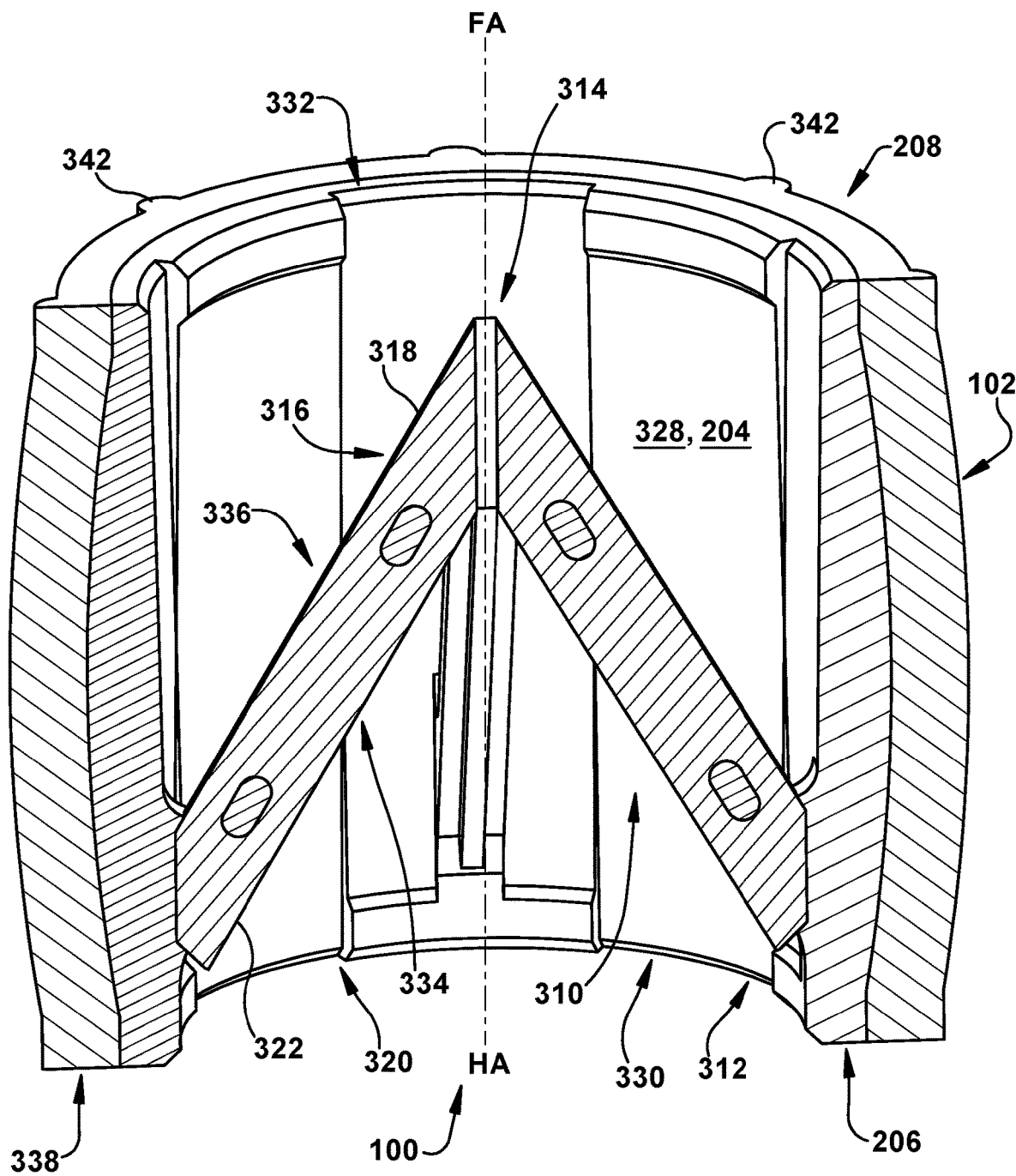
FIG. 3 is a cross-sectional view of a component of the aspect of FIG. 1, taken along line "3-3" in FIG. 2.
Figure 4:
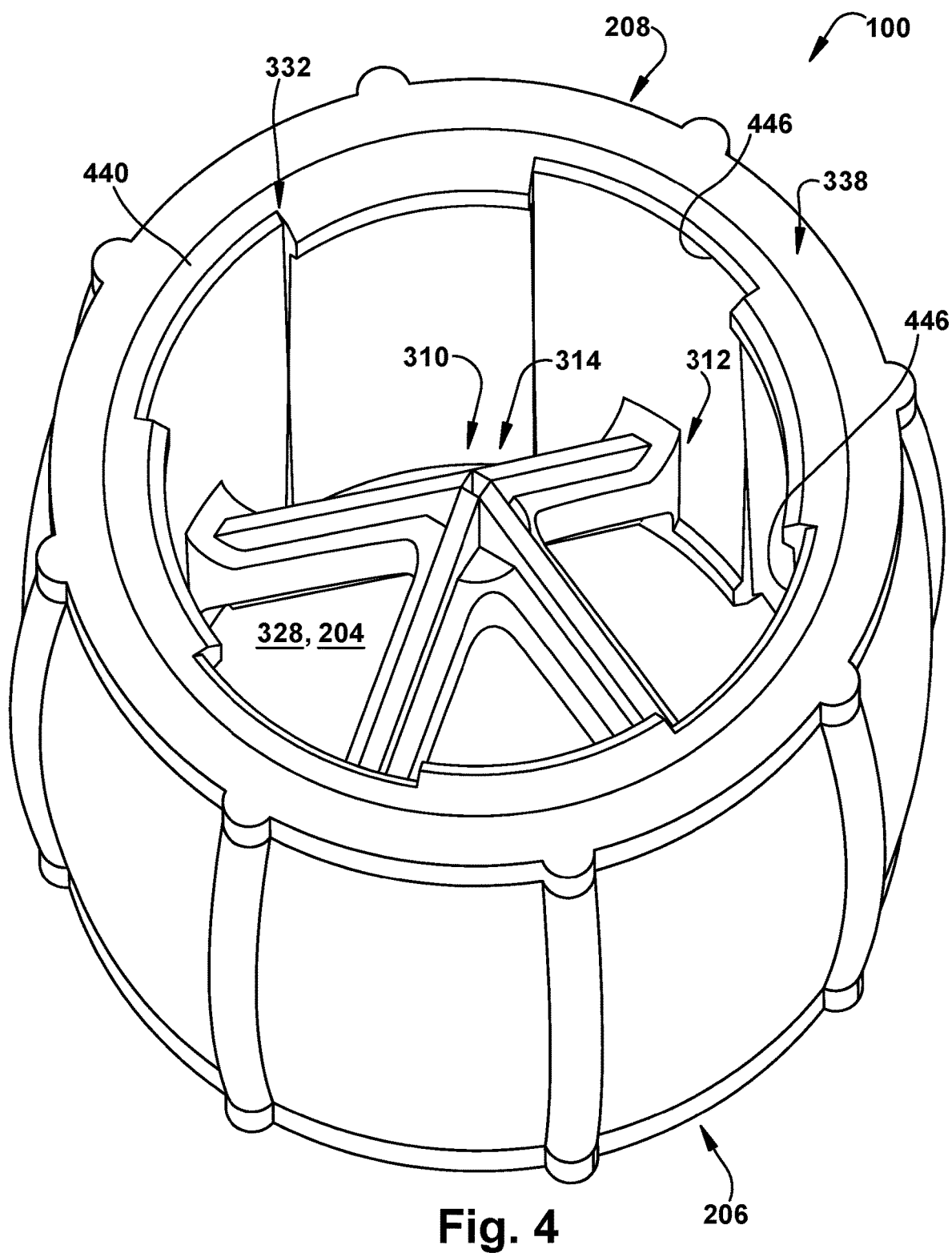
FIG. 4 is a top perspective view of the component of FIG. 3.

FIG. 1 depicts an apparatus 100 for selectively removing material from both an inner and outer circumference of an end of a tubular workpiece. The apparatus 100 includes a cylindrical outer frame 102 defining, as shown in FIG. 2, a frame lumen 204 with longitudinally spaced first and second rims 206 and 208, respectively. A blade holder (shown at 310 in FIG. 3) is substantially located radially within the frame lumen 204 and is affixed, directly and/or indirectly, to the outer frame 102. The blade holder 310 has a conical configuration with a base 312 located longitudinally adjacent the first rim 206 of the outer frame 102 and an apex 314 located longitudinally adjacent the second rim 208 of the outer frame 102. The term "longitudinally adjacent" is used herein to help orient the reader to the direction in which the base 312 and apex 314 of an angled blade holder 310 is arranged within the outer frame 102 as shown in certain of the Figures. It is contemplated that there could be any desired amount of longitudinal space between the base 312 and the first rim 206, and/or between the apex 314 and the second rim 208, without destroying the "longitudinal adjacency" of those two structures.

At least one ID blade 316 is carried by the blade holder 310 and has an ID cutting edge 318 oriented radially outward toward the outer frame 102. At least one OD blade 320 is carried by the blade holder 310 and has an OD cutting edge 322 oriented radially inward toward a central axis A of the outer frame 102. It should be noted that the ID blade 316 and the OD blade 320 could be different portions of a single, double-edged blade which is arranged in relation to the blade holder 310 such that one edge is presented, and functions, as each of the ID and OD blades 316 and 320.

The ID blade 316 may be configured for selective contact with an inner circumference of the end of a tubular workpiece, and rotational motion of the blade holder 310 during such contact causes the ID blade 316 to remove material from the inner circumference. Likewise, the OD blade 320 may be configured for selective contact with and outer circumference of the end of the tubular workpiece, and rotational motion of the blade holder during such contact causes the OD blade 320 to remove material from the outer circumference.

The blade holder 310 may include a plurality of ID blades 316 and a plurality of OD blades 320, as shown in the Figures, with each of the ID blades 316 and OD blades 320 coextending along a conical surface of the blade holder 310. It is contemplated that the plurality of ID blades 316 and the plurality of OD blades 320 may each be substantially evenly radially spaced about the blade holder. This may be helpful, for example, in balancing forces to avoid "wobble" when the apparatus 100 is rotated about the central axis A.

Figure 5:
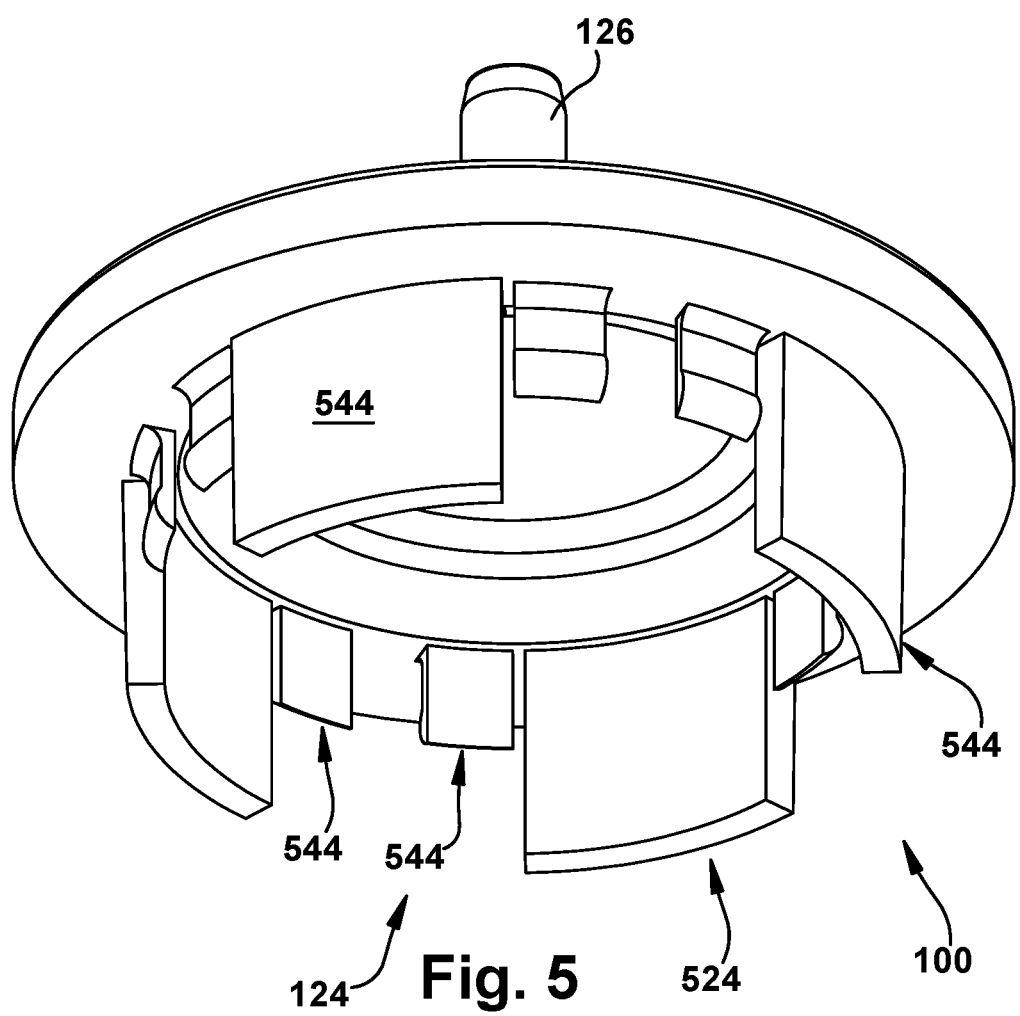
FIG. 5 is a bottom perspective view of a component of the aspect of FIG. 1.
Figure 6:
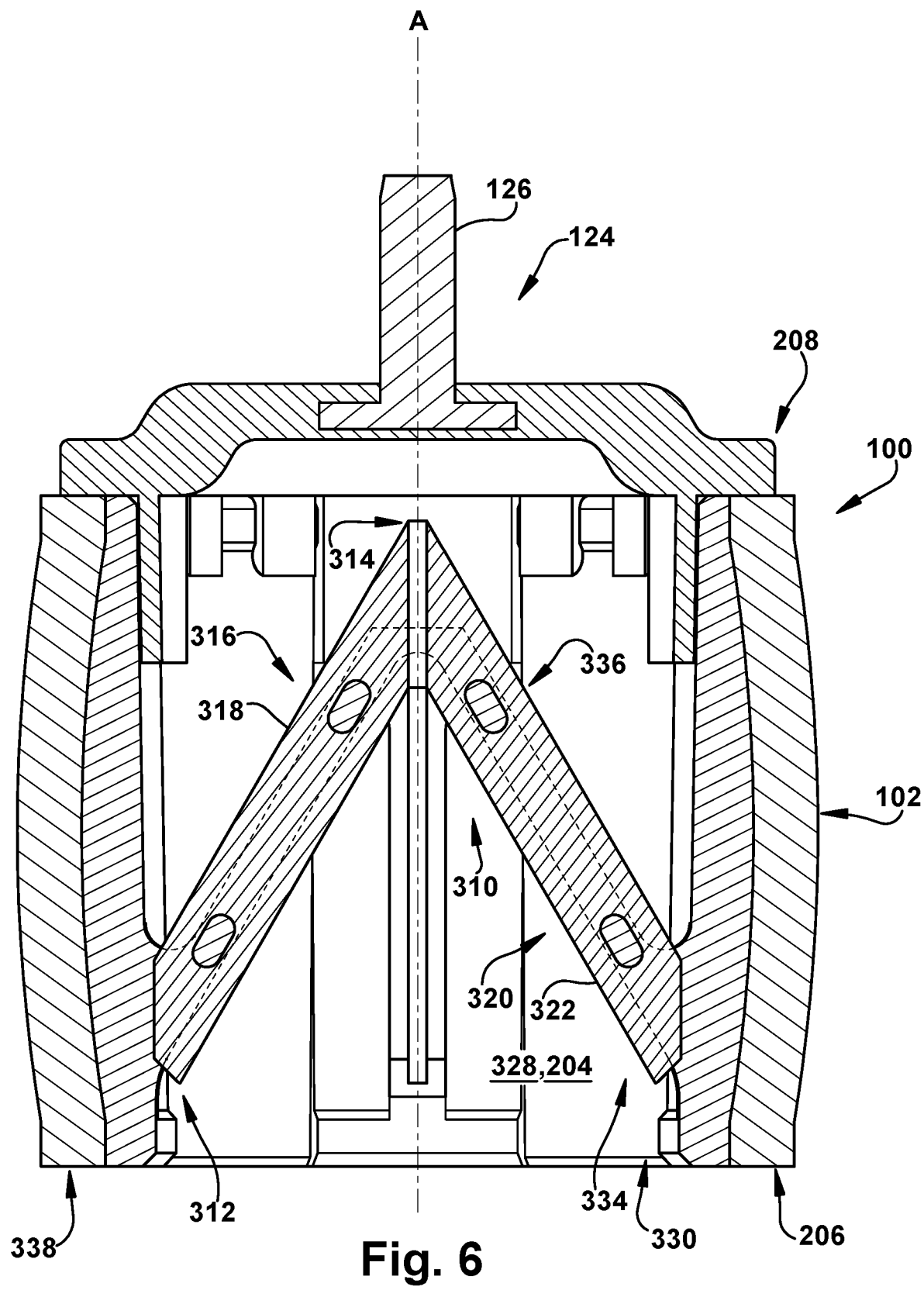
FIG. 6 is a partial side view of the aspect of FIG. 1.

The apparatus 100 may include a motive cap 124 having a rim-coupling feature 524, as shown in FIG. 5, configured for selective engagement sequentially with the first and second rims 206 and 208 of the outer frame 102. The motive cap 124 may be operative to selectively provide rotational motion to the outer frame 102 and thus indirectly to the blade holder 310.

For example, and as shown in the Figures, the motive cap 124 may include a stem 126 configured for selective engagement with a chuck of a drill, the drill being selectively operable to provide rotational motion to the motive cap 124, and the motive cap 124 transmitting the rotational motion from the drill to the outer frame 102 and thus indirectly to the blade holder 310. Optionally, though not shown in the Figures, the stem 126 could include one or more flatted sides, circumferential grooves, or any other features desired to facilitate engagement with a powered driver (e.g., a drill) in order to receive rotational motion which can then be transmitted to the outer frame 102.

With particular reference to FIGS. 3-6, and explained in further detail, an apparatus 100 comprises an outer frame 102 having longitudinally spaced first and second frame rims 206 and 208, respectively. The outer frame 102 radially encloses a deburring volume 328 within the frame lumen 204. The outer frame 102 defines a longitudinal axis FA. A first cap-coupling feature 330 is located adjacent the first frame rim 206. A second cap-coupling feature 332 is located adjacent the second frame rim 208.

A blade holder 310 is affixed substantially within the deburring volume 328. The blade holder 310 has a concave holder portion 334 opening toward the first frame rim 206 and a convex holder portion 336 narrowing toward the second frame rim 208. The blade holder 310 defines a longitudinal axis HA coextending with the longitudinal axis FA of the outer frame 102, with the longitudinal axes HA and FA both being coincident with the central axis A.

For the sake of this extended description, using FIGS. 3-6 as an example, the outer frame 102 could be considered to define a longitudinally extending cylindrical wall 338, and the blade holder 310 is maintained within the deburring volume 328 with a radially outermost portion 312 of the concave holder portion 334 being located longitudinally adjacent the first frame rim 206 and a radially innermost apex 314 of the convex holder portion 336 being located longitudinally adjacent the second frame rim 208.

As can readily be seen with reference to the Figures, the outer frame 102 could be a "barrel", optionally bowed slightly outward at a longitudinally central portion thereof, as shown in FIG. 1. The blade holder 310 could also or instead include a sleeve 440, shown in FIG. 4, from which the concave and convex holder portions 334 and 336 extend radially inward. In the depicted arrangement of FIG. 4, the sleeve 440 is press-fit, adhered, welded (including spin welding), or otherwise securely held within the frame lumen 204 of the outer frame 102. It is contemplated that a radially outward surface of the outer frame 102 could include one or more ribs 342, which may be operable to assist a user in gripping the apparatus 100, for mechanical stiffening/strength, for aesthetic considerations, or provided for any other desired reason.

At least one inner cut rim deburring blade 316 is maintained by the convex holder portion 336 at an angle with the longitudinal axis HA of the blade holder 310. At least one outer cut rim deburring blade 320 is maintained by the concave holder portion 334 at an angle with the longitudinal axis HA of the blade holder 310. At least one of the concave and convex holder portions 334 and 336 may include a plurality of respective deburring blades 320 and 316, respectively. The plurality of deburring blades 320 and 316 may be substantially evenly radially spaced about the respective concave or convex holder portion 334 or 336.

With particular reference now to FIG. 5, the motive cap 124 may include a rim-coupling feature 524 configured for selective engagement sequentially with the first cap-coupling feature 330 and the second cap-coupling feature 332. That is, the rim-coupling feature 524 of the motive cap 124 could be configured to couple or hold on to the first rim 206, and then be removed therefrom and placed into a coupling or holding relationship with the second rim 208. Stated differently, the relationship between the motive cap 124 and the first and second rims 206 and 208 is predetermined to facilitate either the concave holder portion 334 or the convex holder portion 336 being "open" for use, alternatively, as will be discussed below.

The rim-coupling feature 524 may selectively engage with at least one of the first cap-coupling feature 330 and the second cap-coupling feature 332 using at least one of a snap-fit and a frictional-fit connection. For example, and as shown in FIG. 5, a plurality of tabs 544 are positioned and dimensioned to selectively "snap" onto corresponding slots for 46 (shown, for example, in FIG. 4) of the outer frame 102 or the blade holder 310. As another example, the rim-coupling feature 524 may selectively engage with at least one of the first cap-coupling feature 330 and the second cap-coupling feature 332 using a bayonet-style connection. (As used herein, a "bayonet-style connection" is one in which a cylindrical male insert and a female receptor are provided, one having radial pins and the other having cooperating "L"-shaped slots, such that the insert can be slid into the receptor longitudinally and then turned circumferentially to "anchor" the pin into the slot. Optionally, a spring and/or particularly configured slot may be used to help prevent unwanted backout of the insert from the receptor.)

In any event, the motive cap 124 is operative to selectively provide rotational motion (e.g., provided by a drill or other rotating tool) to the outer frame 102 and thus indirectly to the blade holder 310. At least one of the outer frame 102, the cap 124, and the blade holder 310 may be substantially circular in a radially-oriented cross-section (i.e., a cross-section taken transverse to the central axis A).

With particular reference to FIGS. 7A-7D, an apparatus 100 can be provided for deburring a tube 748 having an inside wall 750 radially separated by a tube wall some 52 from an outside wall 754. The tube 748 has a cut tube end 756 with an inner cut rim 758 located at an intersection of the inside wall 750 and the cut tube end 756 and an outer cut rim 760 located at an intersection of the outside wall 754 and the cut tube end 756. At least one of the inner and outer cut rims 758 and 760 of the tube 748 includes a burr.

A method of using the apparatus 100 shown and described above, is shown schematically in FIGS. 7A-7D and includes selectively engaging the rim-coupling feature 524 of the motive cap 124 to the second rim 208 of the outer frame 102, as shown in FIG. 7A. This engagement could be done through a snap-fit, a frictional fit, a bayonet-type connection, or in any other suitable manner. It is contemplated, though, that for most use environments of the apparatus 100 the engagement will be selectively reversible.

Figure 7A:
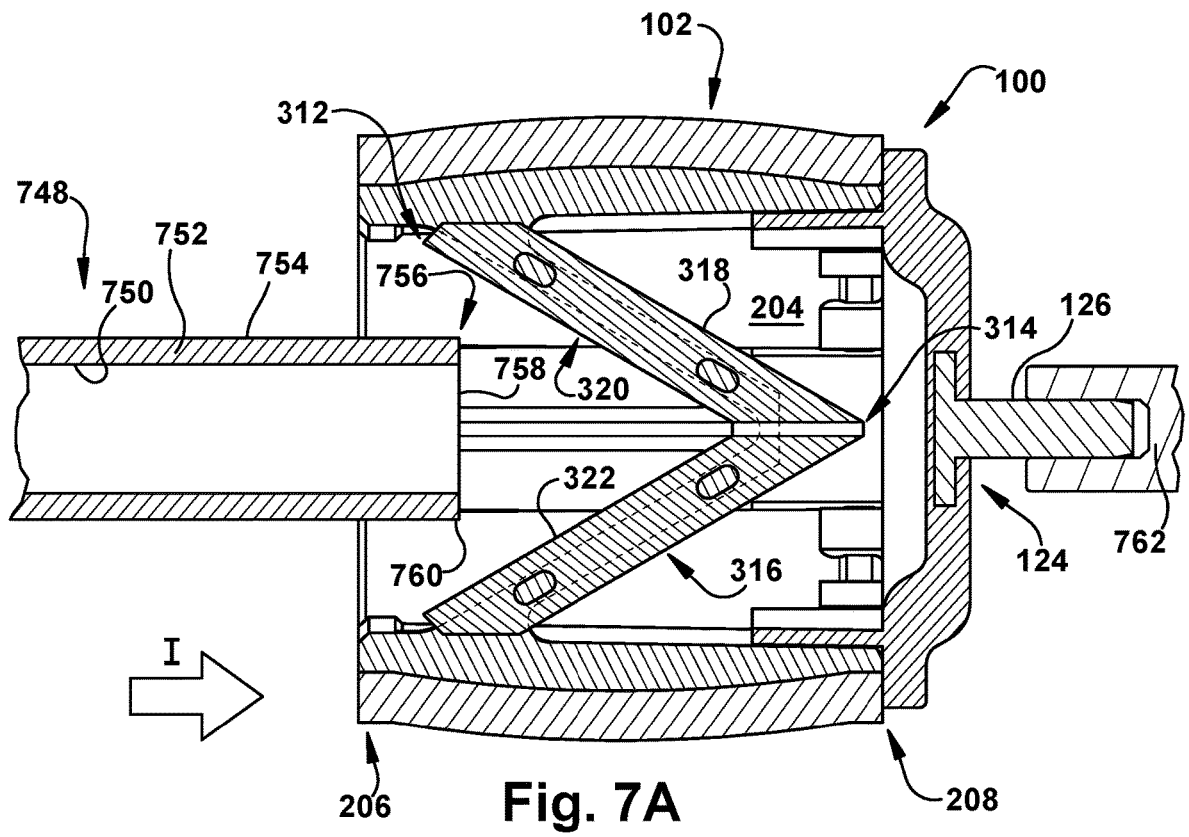
FIGS. 7A-7D schematically illustrate an example sequence of operation of the aspect of FIG. 1.

This engagement, however accomplished, positions the concave holder portion 334 toward and "open" end of the frame lumen 204, with the OD blades 320 ready for use. Again as shown in FIG. 7A, the cut tube end 756 is inserted past the first rim 206 and into the blade holder 310 with at least one OD blade 320 contacting the outer cut rim 760. This insertion direction is shown schematically by the right-facing (in the orientation of FIGS. 7A-7D) arrow "I".

The tube 748 is then held substantially stationary relative to the apparatus 100 while rotational motion is transmitted from the motive cap 124 to the second rim 208 of the outer frame 102 to rotate the blade holder 310, thus urging at least one OD blade 320 into deburring contact with the cut tube end 756, and, more specifically, to the outer cut rim 760 thereof. That is, at least a portion of the motive cap 124 is operatively engaged with a driving tool, shown schematically at 762. For example, the motive cap 124 could include stem 126, and a chuck of a drill 762 could be operatively engaged with the stem 126 for rotational motion transmission thereto. When a driving tool 762 is provided, the driving tool 762 is selectively actuated to provide rotational motion to the motive cap 124, and that rotational motion is transmitted through the motive cap 124 from the driving tool 762 to the outer frame 102.

It is contemplated, however, that the apparatus 100 could be rotated by hand by a user, especially for rather small diameter tubes 748. When hand-operated in this manner, the motive cap 124 could be hand-cranked or otherwise operated via a mechanical connection, or the outer frame 102 could simply be grasped and turned by the user. In this latter instance, the motive cap 124 could be omitted, or could be provided for any desired reason, including, but not limited to, easy cleanup of removed burr particles.

Figure 7B:
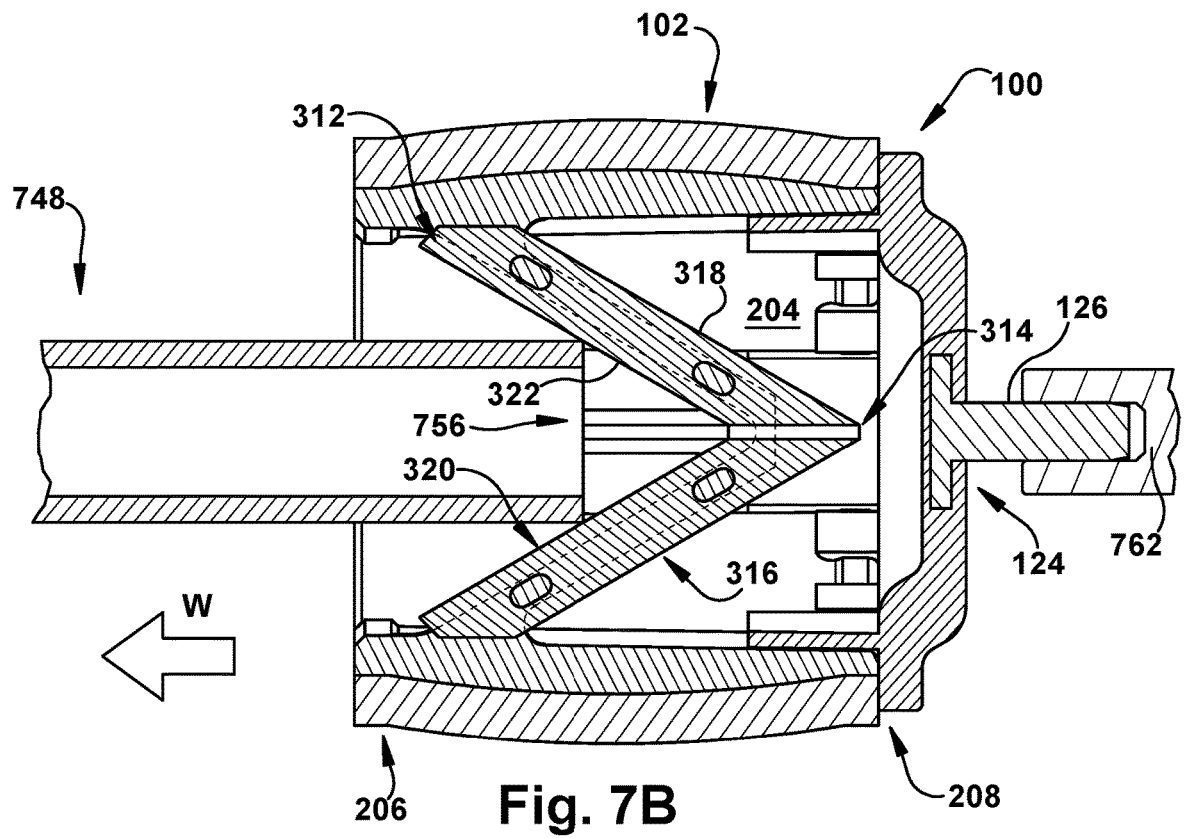

With reference now to FIG. 7B, the cut tube end 756 can then be removed from the blade holder 310, by motion in withdrawal direction "W", toward the left, in the orientation of the Figures. The motive cap 124 can then be removed from the second rim 208 of the outer frame 102, and the outer frame 102 could be flipped around or reversed, into the positioning shown in FIGS. 7C-7D. The rim-coupling feature 524 of the motive cap 124 can then be attached to the first rim 206 of the outer frame 102, to make the apparatus 100 ready to deburr the inner cut rim 758 of the tube 748.

Figure 7C:
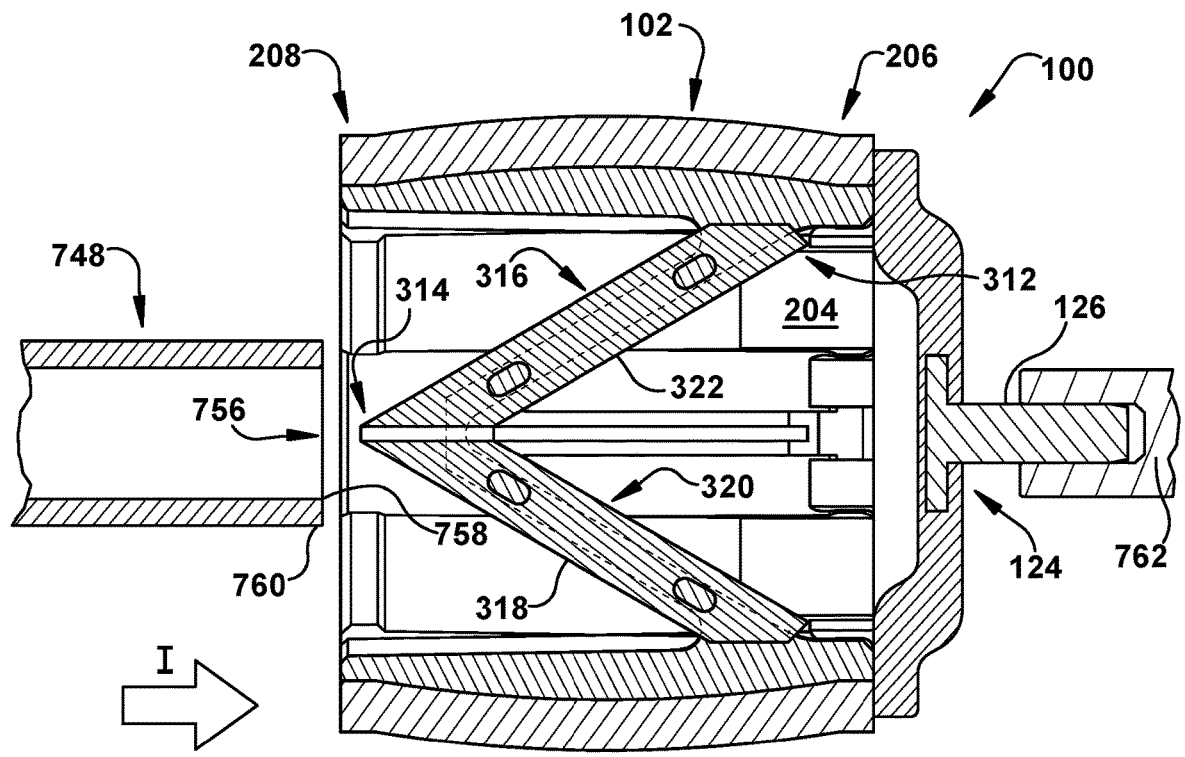
Figure 7D:
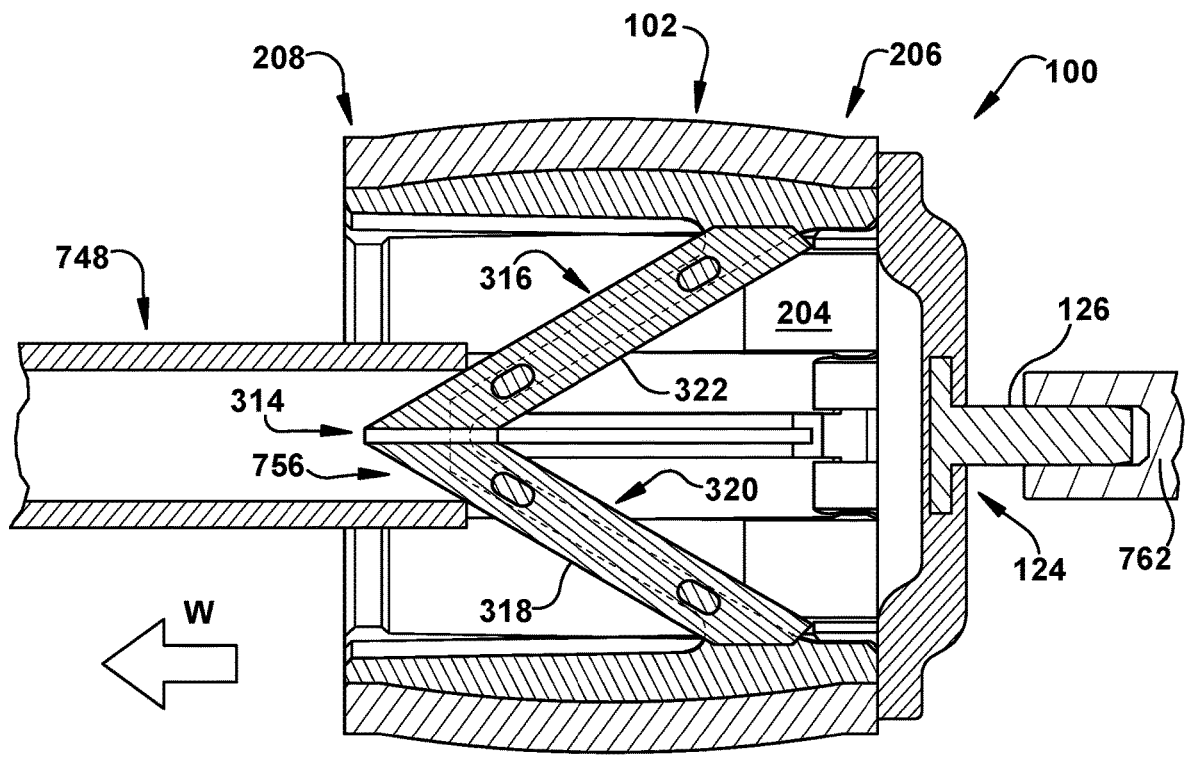

The cut tube end 756 is then inserted in insertion direction I, as shown in FIG. 7C, past the second rim 208 and into the blade holder 310 with at least one ID blade 316 contacting the inner cut rim 758. Rotational motion is transmitted from the motive cap 124 to the first rim 206 of the outer frame 102 to rotate the blade holder 310, thus urging the ID blade 316 into deburring contact with the cut tube end 756. The cut tube end 756 can then be removed from the blade holder 310. Optionally, the motive cap 124 can be removed from the second rim 208 of the outer frame 102 for storage, to perform another deburring operation, or for any other desired reason. It is contemplated that the sequence of FIGS. 7 A-7D could be repeated as often as desired, and with any desired timing, such that the user can remove burr material from both the inner and outer diameter of a cut tube end 756 using a single apparatus 100.

It is contemplated that the blade holder 310 may be configured for selective removal from the outer frame 102, to allow for subsequent installation of a replacement blade holder (not shown) into the outer frame 102, for any reason, such as, but not limited to, accommodating a different size tube 748 providing ID blades 316 and/or OD blades 320 having different physical properties, and/or replacing a worn or damaged blade holder 310. The blade holder 310 is shown with concave and convex holder portions 334 and 336 having a predetermined angular relationship with the central axis A. Due to this angled relationship, tube 748 of different diameters may be deburred with a single apparatus 100.

It is also contemplated that at least a worn one of the ID and OD blades 316 and 320 may be removed from the blade holder 310, and then the removed ID and/or OD blade(s) 316 and 320 could then be replaced with a fresh respective ID and/or OD blade 316 and 320.

It is contemplated, as well, that a magnet and/or adhesive could be provided within the frame lumen 204, to assist with capturing the deburred particles.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. An apparatus for selectively removing material from both an inner and outer circumference of an end of a tubular workpiece, the apparatus comprising:
  a cylindrical outer frame defining a frame lumen with longitudinally spaced first and second rims, the first and second rims each defining a cap-coupling feature including a plurality of protrusions extending inward to the frame lumen, the plurality of protrusions collectively defining a plurality of slots;
  a blade holder being substantially located radially within the frame lumen and affixed to the outer frame, the blade holder having a conical configuration with a base located adjacent the first rim of the outer frame and an apex located adjacent the second rim of the outer frame;
  at least one ID blade carried by the blade holder and having an ID cutting edge oriented radially outward toward the outer frame;
  at least one OD blade carried by the blade holder and having an OD cutting edge oriented radially inward toward a central axis of the outer frame; and
  a motive cap having a rim-coupling feature configured for selective engagement sequentially with the first and second rims of the outer frame, the rim-coupling feature including a plurality of tabs extending longitudinally downward for selective insertion into the frame lumen, at least one slot of the cap-coupling feature corresponding in radial position about the frame lumen to a tab; wherein the motive cap is operative to selectively provide rotational motion to the outer frame and thus indirectly to the blade holder.

2. The apparatus of claim 1, wherein the ID blade is configured for selective contact with the inner circumference of the end of the tubular workpiece, and rotational motion of the blade holder during such contact causes the ID blade to remove material from the inner circumference.

3. The apparatus of claim 1, wherein the OD blade is configured for selective contact with the outer circumference of the end of the tubular workpiece, and rotational motion of the blade holder during such contact causes the OD blade to remove material from the outer circumference.

4. The apparatus of claim 1, wherein the motive cap includes a stem configured for selective engagement with a chuck of a drill, the drill being selectively operable to provide rotational motion to the motive cap, and the motive cap transmitting the rotational motion from the drill to the outer frame and thus indirectly to the blade holder.

5. The apparatus of claim 1, wherein the blade holder includes a plurality of ID blades and a plurality of OD blades, each of the ID blades and OD blades coextending along a conical surface of the blade holder.

6. The apparatus of claim 5, wherein the plurality of ID blades and the plurality of OD blades is substantially evenly radially spaced about the blade holder.

7. The apparatus of claim 1, wherein the outer frame has a barrel shape which bows outward at a longitudinally central portion thereof.

8. The apparatus of claim 1, wherein the blade holder includes a cylindrical sleeve from which convex and concave holder portions extend radially inward, the sleeve being maintained within the frame lumen.

9. The apparatus of claim 1, wherein a radially outward surface of the outer frame includes at least one longitudinally extending rib protruding outward therefrom.

10. The apparatus of claim 1, wherein the rim-coupling feature includes at least one snap-fit lipped tab protruding therefrom, each lipped tab being configured for selective engagement with a corresponding protrusion of the cap-coupling feature within the frame lumen for selectively maintaining the motive cap in engagement with the outer frame.

11. The apparatus of claim 1, wherein the slots of the cap-coupling feature are L-shaped, and the tabs of the rim-coupling feature are configured for an insert-and-turn engagement with the L-shaped slot for a bayonet style attachment within the frame lumen.

12. A method of selectively deburring a tube having an inside wall radially separated by a tube wall from an outside wall, the tube having a cut tube end with an inner cut rim located at an intersection of the inside wall and the cut tube end and an outer cut rim located at an intersection of the outside wall and the cut tube end, at least one of the inner and outer cut rim including a burr, the method comprising:
providing an apparatus including
a cylindrical outer frame defining a frame lumen with longitudinally spaced first and second rims, the first and second rims each defining a cap-coupling feature including a plurality of protrusions extending inward to the frame lumen, the plurality of protrusions collectively defining a plurality of slots,
a blade holder being substantially located radially within the frame lumen and affixed to the outer frame, the blade holder having a conical configuration with a base located adjacent the first rim of the outer frame and an apex located adjacent the second rim of the outer frame,
at least one ID blade carried by the blade holder and having an ID cutting edge oriented radially outward toward the outer frame,
at least one OD blade carried by the blade holder and having an OD cutting edge oriented radially inward toward a central axis of the outer frame, and
a motive cap having a rim-coupling feature configured for selective engagement with the outer frame, the rim-coupling feature including a plurality of tabs extending longitudinally downward;
selectively engaging the rim-coupling feature of the motive cap to the second rim of the outer frame by inserting each tab of the rim-coupling feature into a corresponding slot of the cap-coupling feature of the second rim within the frame lumen;
inserting the cut tube end past the first rim and into the blade holder with the OD blade contacting the outer cut rim;
transmitting rotational motion from the motive cap to the second rim of the outer frame to rotate the blade holder, thus urging the OD blade into deburring contact with the cut tube end;
removing the cut tube end from the blade holder and removing the motive cap from the second rim of the outer frame;
selectively engaging the rim-coupling feature of the motive cap to the first rim of the outer frame by inserting each tab of the rim-coupling feature into frictional engagement with a corresponding slot of the cap-coupling feature of the first rim within the frame lumen;
inserting the cut tube end past the second rim and into the blade holder with the ID blade contacting the inner cut rim;
transmitting rotational motion from the motive cap to the second rim of the outer frame to rotate the blade holder, thus urging the ID blade into deburring contact with the cut tube end; and
removing the cut tube end from the blade holder and removing the motive cap from the first rim of the outer frame.

13. The method of claim 12, including:
operatively engaging at least a portion of the motive cap with a driving tool;
actuating the driving tool to provide rotational motion to the motive cap; and
transmitting rotational motion through the motive cap from the driving tool to the outer frame.

14. The method of claim 13, wherein the motive cap includes a stem, and wherein operatively engaging at least a portion of the motive cap with a driving tool includes operatively engaging the stem of the motive cap with a chuck of a drill.

15. The method of claim 12, wherein the rim-coupling feature includes at least one snap-fit lipped tab protruding therefrom, and wherein at least one of selectively engaging the rim-coupling feature of the motive cap to the second rim of the outer frame and selectively engaging the rim-coupling feature of the motive cap to the first rim of the outer frame includes selectively engaging each lipped tab with a corresponding protrusion of the cap-coupling feature within the frame lumen for selectively maintaining the motive cap in engagement with the outer frame.

16. The method of claim 12, wherein the slots of the cap-coupling feature are L-shaped, and wherein at least one of selectively engaging the rim-coupling feature of the motive cap to the second rim of the outer frame and selectively engaging the rim-coupling feature of the motive cap to the first rim of the outer frame includes placing the tab into an insert-and-turn engagement with the L-shaped slot for a bayonet style attachment within the frame lumen.

17. The method of claim 12, including:
- removing at least a worn one of the ID and OD blades from the blade holder; and
- replacing the removed ID and/or OD blade with a fresh respective ID and/or OD blade.

18. The method of claim 12, including:
- selectively removing the blade holder from the outer frame and subsequently installing a replacement blade holder into the outer frame.

\* \* \* \* \*